US009229348B2

(12) United States Patent
Robinson et al.

(10) Patent No.: US 9,229,348 B2
(45) Date of Patent: Jan. 5, 2016

(54) SYSTEM FOR OPTIMIZING INK USAGE ON A 5 COLORANT CAPABLE PRINTER

(71) Applicant: Xerox Corporation, Norwalk, CT (US)

(72) Inventors: David C. Robinson, Penfield, NY (US); Katherine Loj, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 109 days.

(21) Appl. No.: 14/025,967

(22) Filed: Sep. 13, 2013

(65) Prior Publication Data

US 2015/0078774 A1 Mar. 19, 2015

(51) Int. Cl.
*G06F 3/12* (2006.01)
*G03G 15/01* (2006.01)

(52) U.S. Cl.
CPC .................................. *G03G 15/0121* (2013.01)

(58) Field of Classification Search
CPC ... H04N 1/6033; H04N 1/603; H04N 1/6022; G06F 3/0481; G06F 3/04845; G06K 9/00442; G06K 15/1822; G06K 15/1825; G06K 15/1835; G06K 15/1878; G06K 7/10544; G06K 7/12; G06K 9/00
USPC ................ 358/1.9, 515; 382/162, 167; 347/6
See application file for complete search history.

(56) References Cited

U.S. PATENT DOCUMENTS

| | | | | |
|---|---|---|---|---|
| 5,987,168 | A * | 11/1999 | Decker et al. | 382/167 |
| 2004/0109180 | A1 * | 6/2004 | Braun et al. | 358/1.9 |
| 2005/0094171 | A1 * | 5/2005 | Ogasahara | 358/1.9 |
| 2009/0303556 | A1 * | 12/2009 | Lieberman et al. | 358/515 |
| 2010/0026740 | A1 * | 2/2010 | Noguchi | 347/6 |

* cited by examiner

*Primary Examiner* — Martin Mushambo
(74) *Attorney, Agent, or Firm* — Fay Sharpe LLP

(57) ABSTRACT

A system and method for optimizing toner usage on an output device capable of rendering in five or more colorants includes receiving a print job for rendering a print job. The method includes generating at least one candidate colorant combination using multiple colorants. The method includes determining at least one factor including (i) a toner usage, (ii) a toner cost, and (iii) an accuracy of the at least one candidate colorant combination for rendering a select object of the print job. The method further includes selecting an ideal candidate colorant combination based on a comparison of the at least one factor with one of a second candidate colorant combination and an original CMYK colorant combination.

19 Claims, 8 Drawing Sheets

SYSTEM FOR OPTIMIZING INK USAGE ON A 5 COLORANT CAPABLE PRINTER

BACKGROUND

The present disclosure relates to a system for optimizing toner usage on a printer device capable of rendering output using a fifth colorant housing. The disclosure is also capable of determining a colorant combination considering five colorants and can be adapted to generate modified colorant separation information.

Conventional printer devices support four colorant housings: cyan, magenta, yellow, and black ("CMYK"). Conventional devices utilize these four particular colorants because, traditionally, different CMYK combinations can produce the greatest number of colors using the least amount of toner. This benefit caused the CMYK printing process, using subtractive color mixing, to become the standard in the printing industry.

Recent printer devices are configured to support a fifth colorant housing. The extra housing (cartridge) can contain a toner for a fifth color different from CMYK, such as, for example, 'red', or a magnetic ink used in Magnetic Ink Character Recognition ("MICR") printing. Certain ones of these printer devices can support any made-to-order colorant.

Page Description Language ("PDL") files can provide the printer devices with color separation information. Color separation is the act of decomposing a digital image into single color layers (s.a., in four basic CMYK toner colors) for rendering the image in an offset printing process. Each single color layer is printed separately, one on top of the other, to collectively give the impression of a desired color.

For the recently developed printer devices capable of utilizing five colorant housings (herein referred to as "CMYKX"), a desired color previously rendered using a select combination of CMYK colorants may also be achieved using different combinations of two, three, or four CMYKX colorants, each including the fifth colorant X. The ideal combination of the five colorants CMYKX, however, is not known. The ideal combination, in one embodiment, can be the combination of colorants that consumes the least amount of toner. In another embodiment, the ideal combination can be the one that renders the closest matching color in appearance. In yet another embodiment, the ideal combination can be the one that is associated with the least expensive toner costs. The color separation included in the PDL file does not consider the toner usage, toner cost or accuracy (hereinafter referred to as "factors"). Nor does the color separation information define a separation for a fifth colorant housing.

A method and a system is desired for reducing toner usage by rendering a print job using a colorant combination that requires the least amount of toner. A desired method and system determines a combination of CMYKX colorants that consumes the least toner. Furthermore, the desired method and system can determine the best combination for rendering each object within the file by considering combinations including at least the fifth colorant X. In this manner, certain objects can be rendered with less toner or less expensive toner than using standard CMYK colorant combinations. By lowering the toner usage or the combination of colorants, the selected colorant combination can also translate to lower costs, absorbed by the user (printer and/or the customer), for rendering the document.

BRIEF DESCRIPTION

One embodiment of the disclosure relates to a method for optimizing toner usage on an output device capable of rendering in five or more colorants. The method includes receiving a print job for rendering a print job. The method includes generating at least one candidate colorant combination using multiple colorants. The method includes determining at least one factor including (i) a toner usage, (ii) a toner cost, and (iii) an accuracy of the at least one candidate colorant combination for rendering a select object of the print job. The method further includes selecting an ideal candidate colorant combination based on a comparison of the at least one factor with one of a second candidate colorant combination and an original CMYK colorant combination.

Another embodiment of the disclosure relates to a system for optimizing toner usage on an output device capable of rendering in five or more colorants. The system includes a colorant determination device having a memory which stores modules and a hardware processor in communication with the memory configured to execute the modules. The device includes a colorant combination generation module configured to generate at least one candidate colorant combination in response to receiving a print job for rendering a print job. The device includes a toner usage determination module configured to determine an amount of toner needed for the at least one colorant combination to render the print job. The device includes an accuracy determination module configured to determine an accuracy of the at least one candidate colorant combination at representing a desired color. The device further includes a selection module configured to select to select an ideal colorant combination based on at least one factor including the toner usage, a toner cost, and the accuracy. The selection module is operative to compare the at least one factor of the at least one candidate colorant combination with at least a similarly computed factor of a second candidate colorant combination.

DETAILED DESCRIPTION

The disclosure relates to a method and a system for determining colorant combination using five colorants, yet requiring the least amount of toner while providing a closest match to the desired color appearance. The method and system determines the best combination for rendering each object within a file by considering combinations including at least the fifth colorant X.

Figure 1:
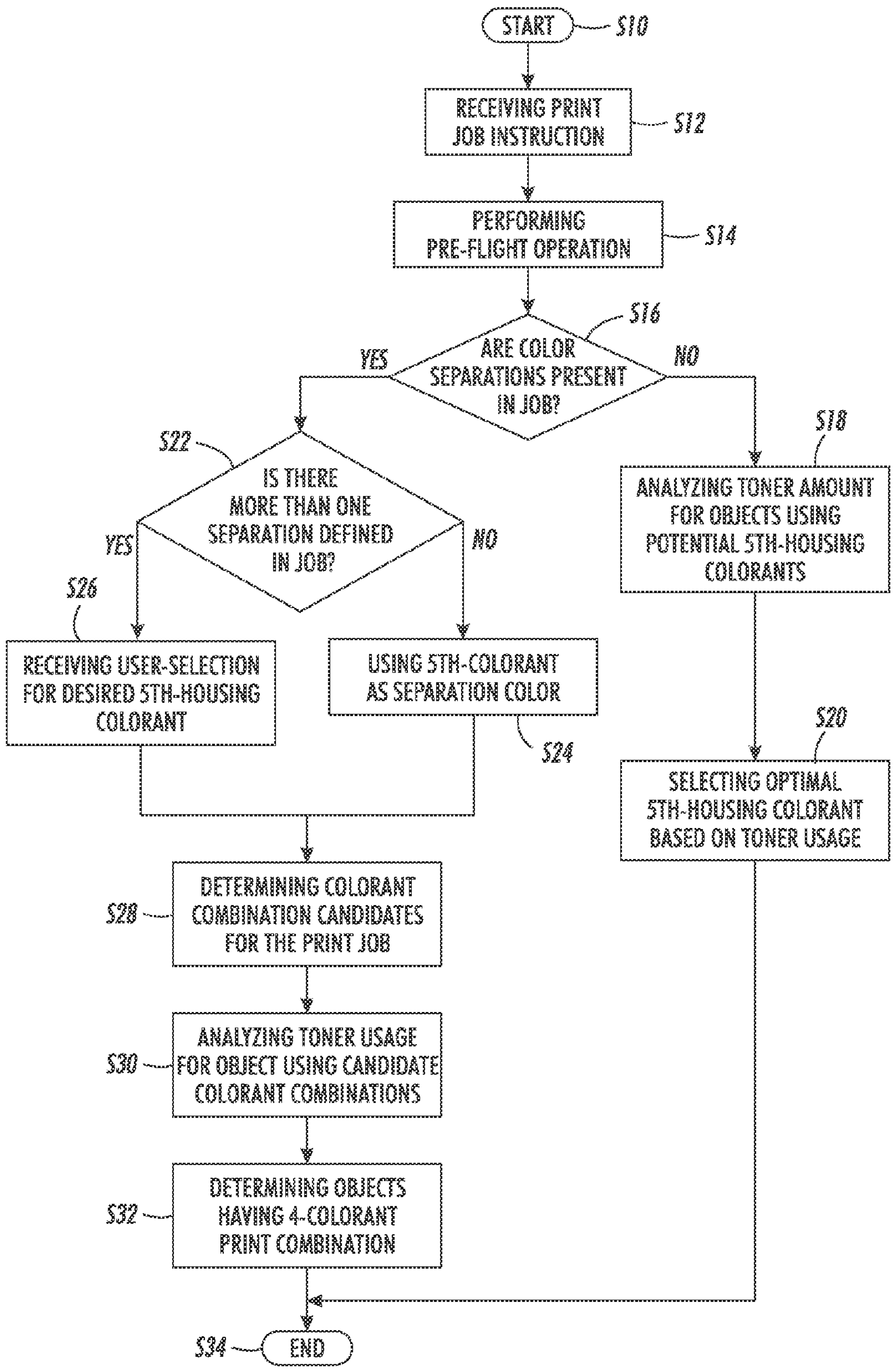
FIG. 1 is a flow chart illustrating a method for optimizing toner usage on an output device capable of rendering in five or more colorants according to the disclosure.

FIG. 1 is a flow chart illustrating an overview of the present method for optimizing toner usage on an output device capable of rendering in five or more colorants. The method starts at S10. The system receives a print job instruction at S12 for rendering output. The system pre-flights the received print job to determine candidate colorant combinations using the additional/fifth color at S14. The preflight operation determines if the printer device and color separation information is defined within the print job file. In response to multiple color separations not being defined (NO at S16), the system analyzes toner consumption for each object using a potential fifth colorant housing at S18. Generally, the system analyzes toner consumption using various options of additional colors beyond CMYK. The fifth color that uses the least amount of toner is selected as an optimal fifth colorant housing at S20. Generally, the system can display the optimal fifth colorant for the user to load.

In response to multiple color separations being defined (YES at S16), the system determines if the number of color separations is greater than one at S22. In response to only one color separation, i.e., beyond CMYK, being present (NO at S22), the system uses the fifth color in the later-described processing. In response to more than one color separation being present (YES at S22), the system provides the user with options on a display for the additional colorant and receives a user-selection for the desired fifth colorant to be used for processing at S26.

The system then analyzes each object within the file to determine which color combinations of CMYKX renders the closest match to the desired color while consuming the lowest amount of toner. The system first determines candidate colorant combinations for the object at S28. These combinations generally include three or four CMYK colorants and the fifth color. The toner usage is analyzed for each candidate colorant combination at S30. The toner usage is analyzed by applying the candidate colorants in a low resolution RIP operation and determining which colorant combination requires the lowest number of pixels within the three-/four-planes used to generate the object. The system then determines the objects having a four-colorant print combination at S32. The method ends at S34.

Figure 2:
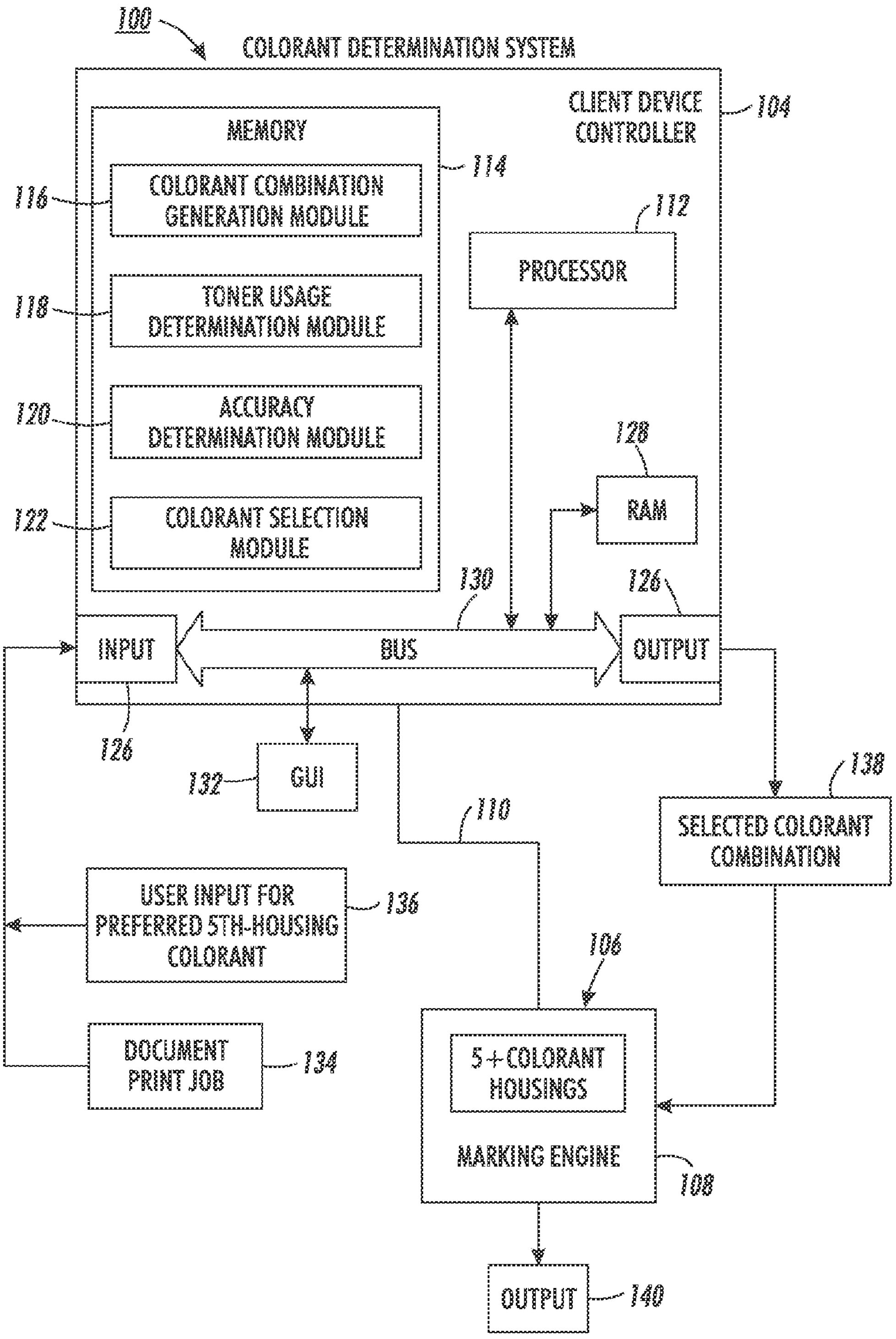
FIG. 2 is a schematic illustration of a system in one aspect of the exemplary embodiment.

FIG. 2 is a schematic illustration of a system 100 for optimizing toner usage on a five-colorant capable printer, according to one aspect of the exemplary embodiment. The system 100 may include a colorant determination system 102, hosted by a client computing device 104, such as a digital front end ("DFE") or controller, and an image forming apparatus or printer device 106, including a marking engine or similar rendering device 108, which are linked together by communication links 110, referred to herein as a network. These components are described in greater detail below.

The client device 104 illustrated in FIG. 2 includes a processor 112, which controls the overall operation of the colorant determination system 102 by execution of processing instructions, which are stored in memory 114 connected to the processor 112.

The toner-reducing colorant combination determination and selection operation disclosed herein is performed by the processor 112 according to the instructions stored in the memory 114. In particular, the memory 114 stores a colorant combination generation module 116, which generates candidate colorant combinations; a toner usage determination module 118, which determines a percentage of each colorant in a candidate colorant combination needed to render an object; an accuracy determination module 120, which determines the candidate colorant combination having the lowest number of pixels outside boundaries of the desired color gamut; and, a colorant selection module 122, which selects a colorant combination from the candidate colorant combinations based on the determined factors. These modules 116-122 will be later described with reference to the exemplary method. In general, the modules 116-120 take an instruction and document 134, received as input for rendering the document, and consider a user-selection optionally received for a fifth housing colorant 136, for providing a selected colorant combination 138 to the printer device 106 for rendering the output 140.

The client device 104 includes one or more communication interfaces (I/O), such as network interfaces 126 for communicating with external devices, such as printer device 106. The various hardware components 112, 114, (random access memory "RAM") 128 of the client device 104 may all be connected by a bus 130.

With continued reference to FIG. 2, the client device 104 is communicatively linked to a user interface device (GUI) 132 via a wired and/or wireless link. In various embodiments, the user interface device 132 may include one or more of a display device, for displaying information to users, and a user input device, such as a keyboard or touch or writable screen, for inputting instructions and/or receiving status information, and/or a cursor control device, such as a mouse, trackball, or the like, for communicating user input information and command selections to the processor 112. Specifically, the user interface device 132 includes at least one of an input device and an output device, both of which include hardware, and which are communicatively linked with the client device 104 via wired and/or wireless link(s).

As mentioned, the client device 104 of the colorant determination system 102 is communicatively linked with the printer 106 via link 110. While the client device 104 may be linked to as few as one printer 106, in general, it can be linked to a fleet of printers. The exemplary printers 106 may each include the marking engine 108, which applies marking medium, such as ink or toner, to a substrate, such as paper, using, for example, a laser, inkjet, thermal, or other transfer process. The printer 106 renders images on print media, such as paper, and can be a copier, laser printer, bookmaking machine, facsimile machine, or a multifunction machine (which includes one or more functions such as scanning, printing, archiving, emailing, and faxing).

The memory 114, 128 may represent any type of tangible computer readable medium such as random access memory (RAM), read only memory (ROM), magnetic disk or tape, optical disk, flash memory, or holographic memory. In one embodiment, the memory 114, 128 may each comprise a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processors 112 in addition to controlling the operation of the colorant determination system 102, executes instructions stored in the modules 116-122 for performing the parts of the method outlined below.

The software modules 116-122 as used herein, are intended to encompass any collection or set of instructions executable by the system 100 so as to configure the system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 126 may include, for example, a modem, a router, a cable, and/or Ethernet port, etc.

As will be appreciated, while colorant determination system 102 and printer 106 are illustrated by way of example, the system 100 may be hosted by fewer or more linked computing devices. Each computing device may include, for example, a server computer, desktop, laptop, or tablet computer, smartphone or any other computing device capable of implementing the method described herein.

Figure 3:
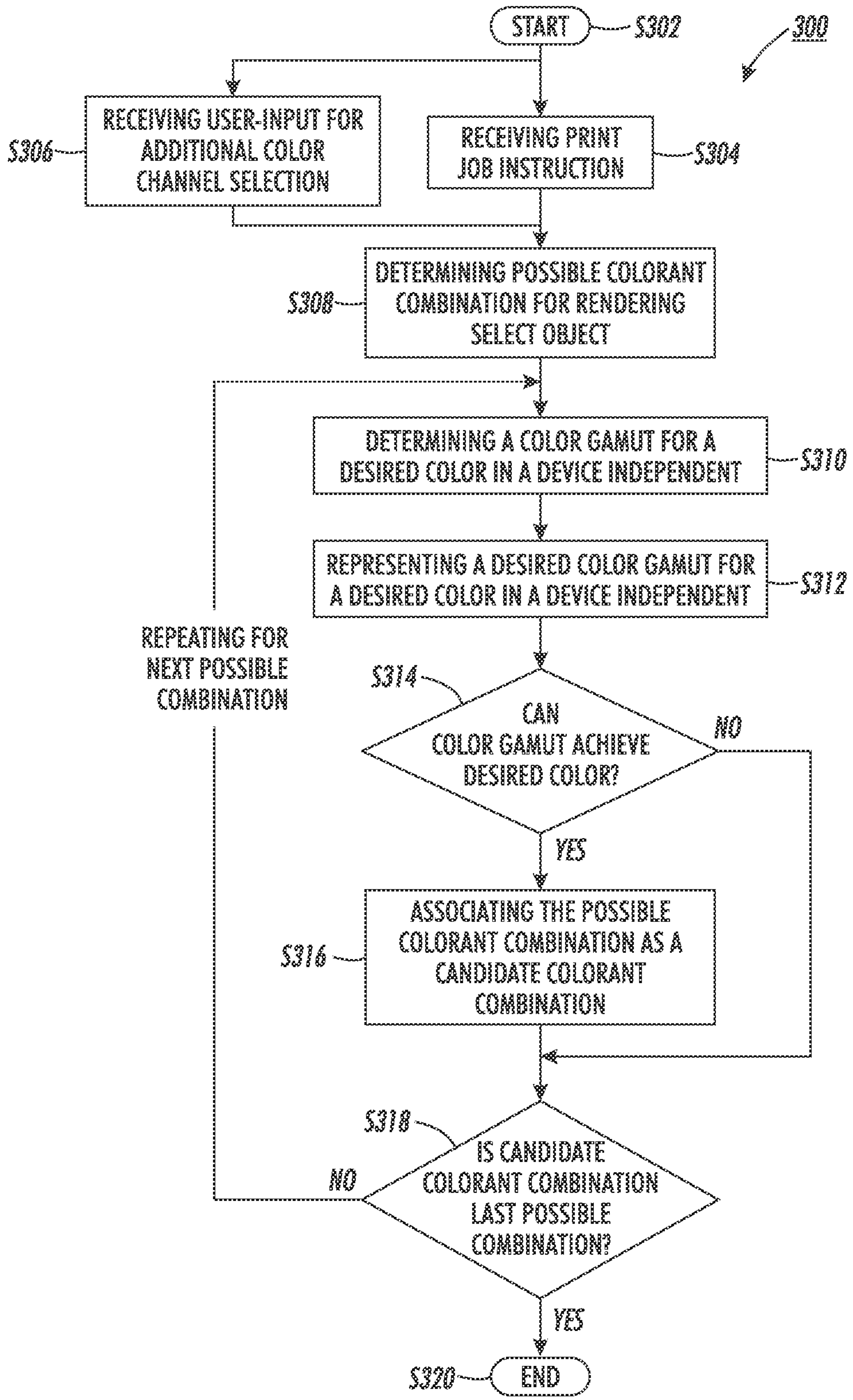
FIG. 3 is a flow chart illustrating a process for generating candidate colorant combination(s) using multiple colorants according to the exemplary method.
Figure 4:
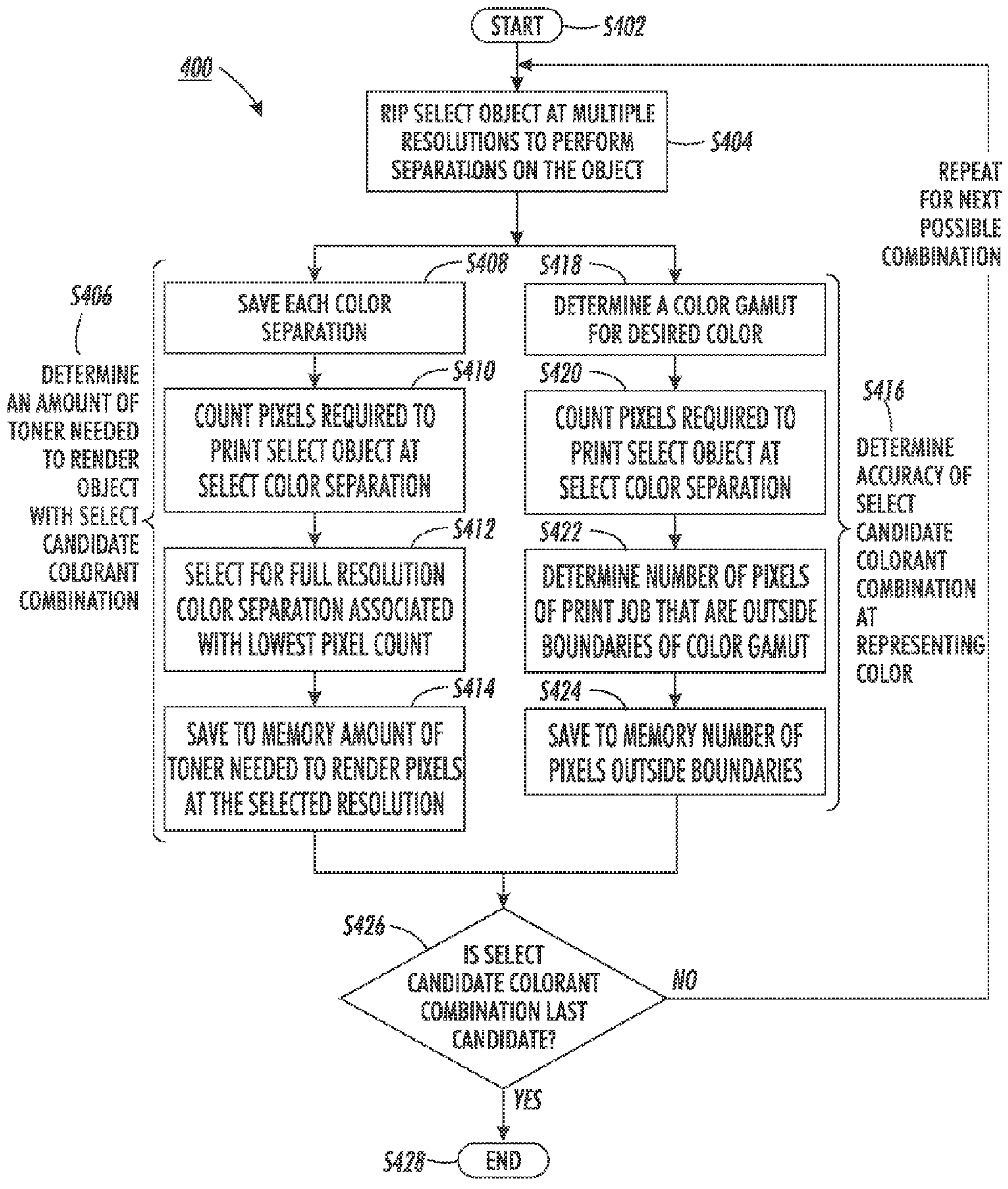
FIG. 4 is a flow chart illustrating a process for analyzing factors of toner usage and accuracy of each candidate colorant combination generated in FIG. 3 according to the exemplary method.
Figure 5:
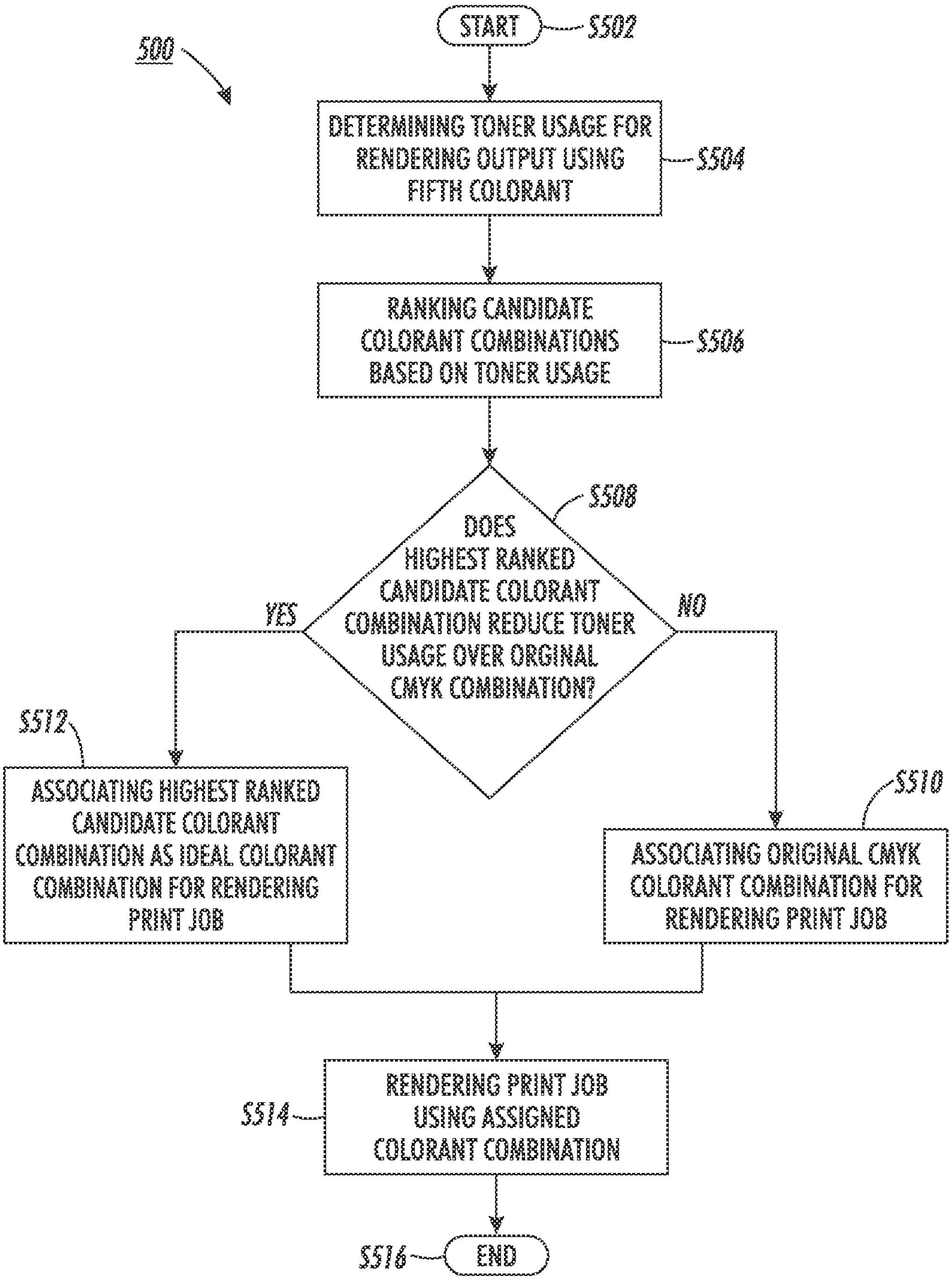
FIG. 5 is a flow chart illustrating a process for selecting a colorant combination based on results of the toner usage analysis of FIG. 4 according to the exemplary method.

As mentioned, the colorant determination system 102 selects an ideal colorant combination for rendering each object in the print job. "Object" may refer to a partial segment in a full, multi-color image, a full (single-color) image on a page, a page/sheet (e.g., in a single color), or the entire document which the analysis is performed on. For example, embodiments are contemplated where the analysis can be performed on a page or document basis. Each "object" is associated with a desired color included in or added into the job data, which is provided with the print instruction. The method described in FIGS. 3-5 are repeated for each object in the print job.

As part of the selection process, the colorant determination system 102 generates at least one candidate colorant combination using multiple colorants. A process 300 for determining candidate colorant combinations using a fifth colorant is shown in FIG. 3. The method starts at S302. The system 102 receives a print job instruction at S304. The system 102 can use a predetermined fifth colorant based on the fifth colorant housing located in the printer device 106. Alternatively, the system can contemporaneously receive a user-selection for a select fifth colorant housing where there are six or more colorant housings at S306. In other words, embodiments of printer devices are contemplated as including more than five colorant housings. For example, the method disclosed herein is equally applicable to printer devices housing six or more colorants. In this manner, a user can select the fifth colorant X from multiple colorants which differ from CMYK. However, embodiments are contemplated where no color separation information is present within the print job. In these embodiments, the system can analyze multiple additional colorant housings (using the below-described method) to determine an ideal fifth colorant to load for minimal ink usage.

The colorant combination generation module 116 determines possible colorant combinations that can be generated using the five colorants CMYKX at S308.

All possible combinations are considered and analyzed to determine which combinations can achieve the desired color. Using the color separation information, the desired color can be defined as a percent of each of CMYK in the CMYK color space. In an illustrative example, the desired color can be defined as [0, 0.75, 0.5, 1], however there is no limitation to the percent representations. Using the illustrative example in an embodiment where the predetermined or selected fifth colorant is red, possible colorant combinations can be generated to include, inter alia, CYK+Red, CMK+Red, and CMYK, etc. The possible combinations are determined based on the percentages of CMYK. Because magenta M and yellow Y separations only partially make up the desired color, one or more of these colors are considered for being replaced (or the percentages adjusted) using the fifth colorant housing.

For the select object associated with the desired color, a color gamut for each of the possible CMYKX colorant combinations is generated at S310. The module 116 represents a color gamut for the desired color in a device independent color space (e.g., CIELAB) at S312. The module 116 compares the possible combination gamut with the desired color gamut at S314 to determine where the possible color combination falls within the desired device independent color space. In response to the possible combination being able to achieve the desired color (YES at S314), the module 116 associates the possible colorant combination as a candidate colorant combination at S316. In response to the possible combination not being able to achieve the desired color (NO at S314), the module 116 determines if the candidate combination being analyzed is the last combination at S318. Similarly, after associating a processed possible colorant combination as the candidate colorant combination at S216, the module 116 determines if the candidate colorant combination being analyzed is the last combination at S318. In response to the candidate combination not being the last combination (NO at S318), the module 116 does not treat the possible colorant combination as a candidate colorant combination, and the process repeats for the next possible combination starting at S310. In response to the candidate combination being the last combination analyzed (YES at S318), the method ends at S320.

The candidate colorant combinations are provided to the toner usage determination module 118 and the accuracy module 120 for analysis. FIG. 4 is a flowchart showing the analyses 400 performed for each candidate colorant combination being considered for the select object. The method starts at S402. As part of that analysis, a raster image processor ("RIP") performs color separations on the object at S404. The object is raster image processed (RIPped) multiple times at low resolution using the select candidate color combination.

In a first analysis performed on a select candidate colorant combination, the toner usage determination module 118 determines an amount of toner needed for rendering the object with the select colorant combination at S406. In other words, the module determines what percentage of each colorant in the colorant candidate combination is needed to generate the individual object.

The resulting color separation is saved for each resolution at S408. The number of pixels required to print the object are counted for each saved color separation at S410. The color separation associated with the lowest number of pixels is selected for the full resolution RIPping at S412. The amount of toner needed to render the pixels in the color separation is associated with the select colorant combination and saved in the memory at S414.

In a parallel process, or a subsequent process, the accuracy determination module 120 determines an accuracy of the select candidate colorant combination at representing the desired color at S416. The module determines a color gamut for the desired color at S418 (or refers to the gamut previously determined at S312). The module 120 maps the pixels of the object to the desired color gamut at S420. The module 120 determines a number of pixels of the object that lie outside the boundaries of the desired color gamut at S422. The determined number of pixels of the object that lie outside the boundaries of the desired color gamut is associated with the select colorant combination and saved in the memory at S424.

The modules determine whether the select candidate colorant combination analyzed under processes S404 and S416 was the last candidate combination at S426. In response to the select candidate colorant combination not being the last candidate colorant combination (NO at S426), the process is repeated for the next candidate colorant combination. In response to the select candidate colorant combination being the last candidate colorant combination (YES at S426), the method ends at S428.

Figure 6:
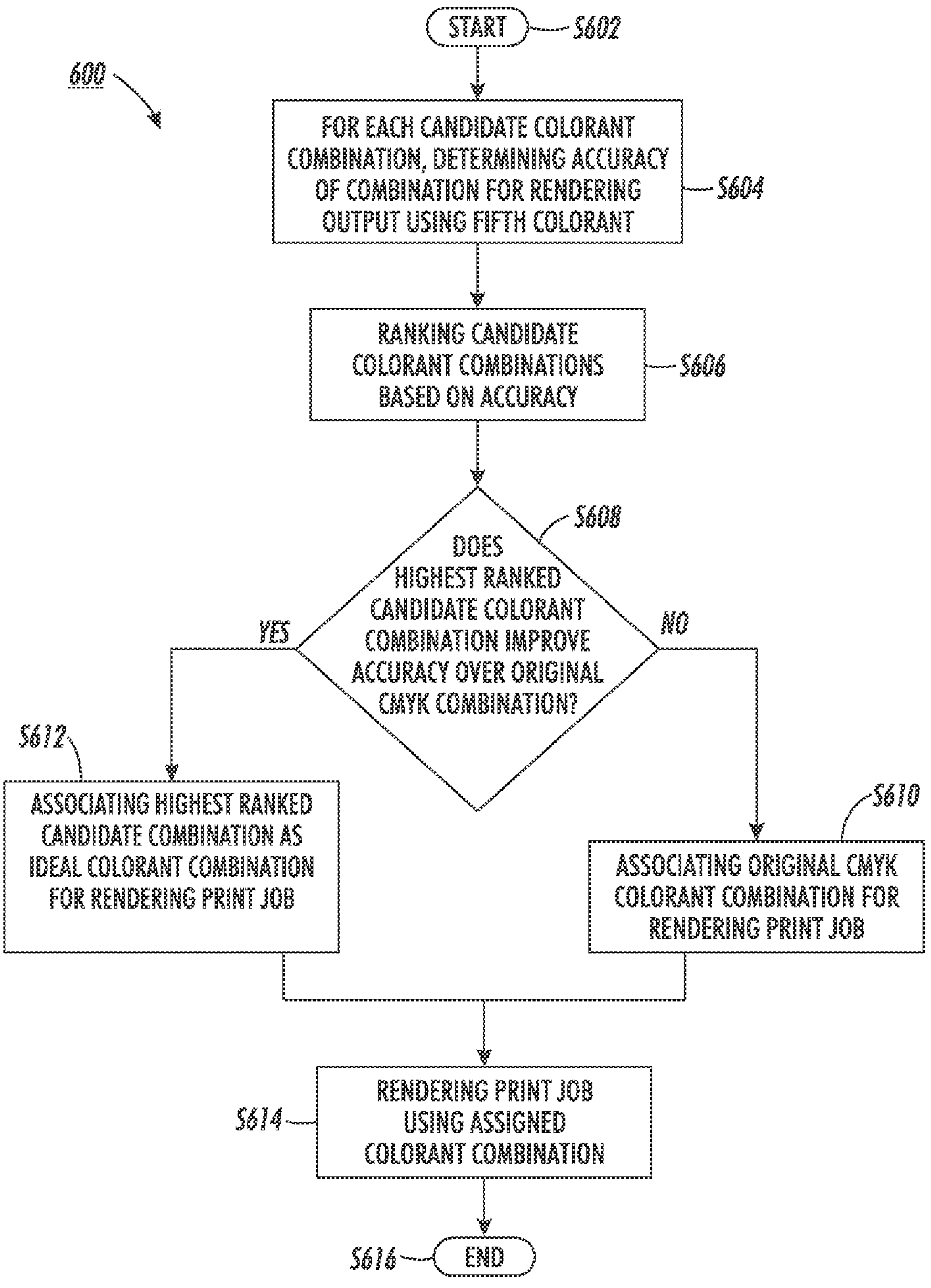
FIG. 6 is a flow chart illustrating a process for selecting a colorant combination based on results of the toner accuracy analysis of FIG. 4 according to the exemplary method.
Figure 7:
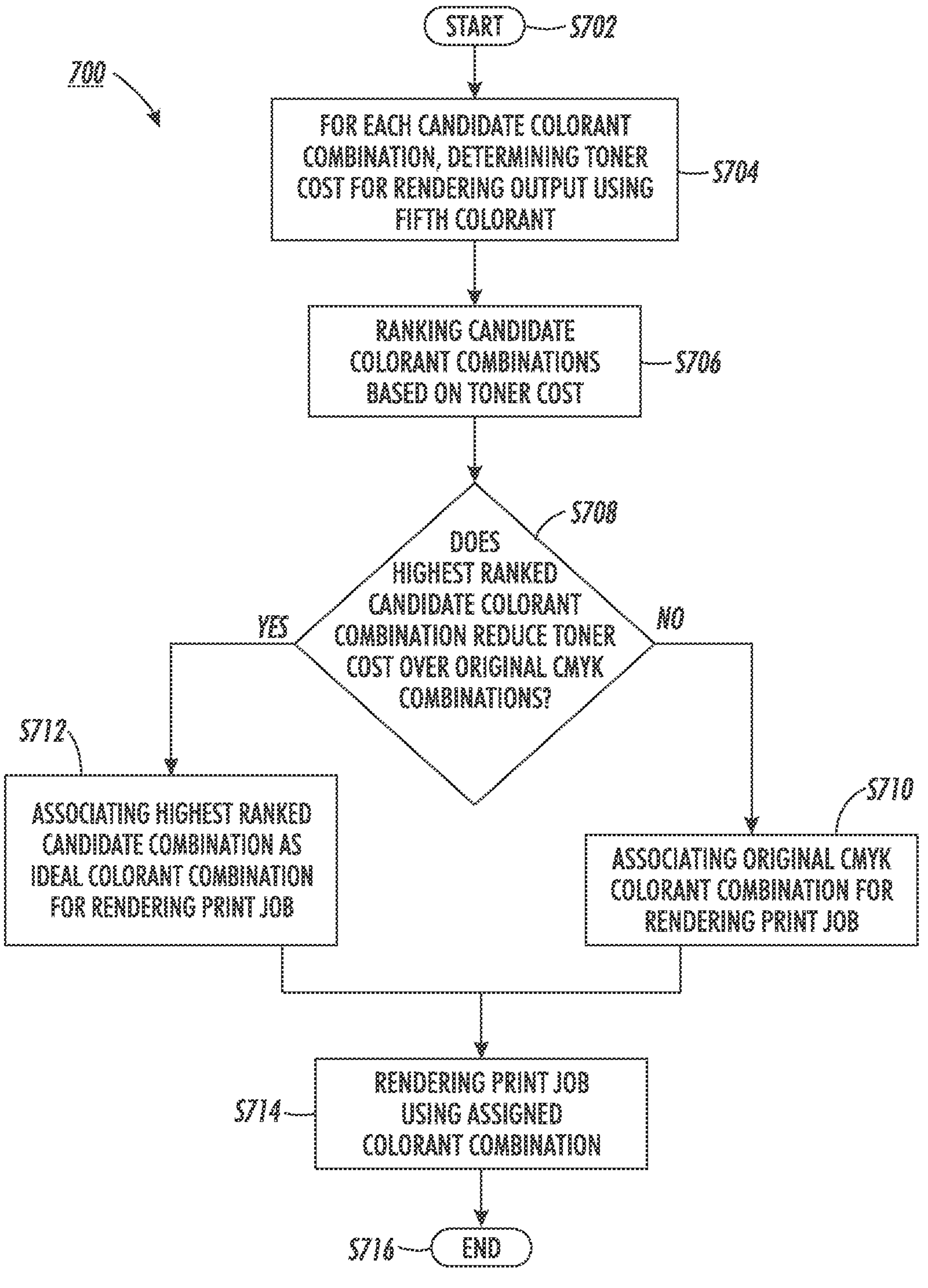
FIG. 7 is a flowchart showing a process for selecting the ideal colorant combination based on the lowest toner cost.

FIGS. 5-7 is a flowchart showing a process 500 for selecting the ideal colorant combination using results of the factor analyses performed on each candidate colorant combination and generated in FIG. 4. FIG. 5 is a flow chart illustrating a process for selecting a colorant combination based on results of the toner usage analysis of FIG. 4. The colorant selection module S122 selects a colorant combination corresponding with the lowest toner usage for rendering the print job. The method starts at S502. The module 122 determines the toner usage for rendering the output using the fifth colorant in each candidate combination at S504. The toner usage information was computed at S406 and can be transmitted from the toner usage determination module 118 to the colorant selection module 122. As mentioned, this amount of toner is based on the number of pixels counted for rendering the object at the full resolution. Each candidate colorant combination is ranked based on the lowest toner usage to highest toner cost at S506. The module 122 determines whether the highest ranking (i.e., lowest amount of toner usage needed to render the object) candidate colorant combination reduces the toner usage over the original CMYK colorant combination at S508. In contemplated embodiments, the toner usage module 118 determines the amount of toner needed to render an object using the original CMYK colorant combination. In response to the highest ranking candidate colorant combination not reducing the toner usage over the original CMYK colorant combination (NO at S508), the original CMYK colorant combination is selected as the colorant combination for associating with the object in the rendering process at S510. In response to the highest ranking candidate colorant combination reducing the toner usage over the original CMYK colorant combination (YES at S508), the candidate colorant combination having the highest rank is selected as the ideal colorant combination for associating with the object in the rendering process at S512. The selected one of the ideal or original colorant combination can be saved in the memory and applied to the corresponding object at the time of RIPping and/or printing at S514. The method ends at S516.

In one embodiment, for example, the candidate colorant combinations can be ranked according to the results of the toner usage analysis, whereby the candidates are ranked from lowest toner consuming combination to highest toner consuming combination. Objects rendered with lower toner usages may not be the most accurate. That is, the lowest toner consuming colorant combination may not always provide a close or substantially close match to the desired color. Therefore, in one embodiment, the L*a*b values of the object in a profile connection space ("PCS") can be compared to the L*a*b values of a potential "optimal" 4/3 color combination, after the potential combination is converted. An outcome of the toner consumption analysis is compared to a predetermined threshold. In response to the toner consumption exceeding the threshold, an error occurs. In response to the error, a second candidate colorant combination can be selected as the ideal colorant combination. In response to the toner consumption not exceeding the threshold, the candidate colorant combination is associated with the ideal colorant combination.

FIG. 6 is a flow chart illustrating a process for selecting a colorant combination based on results of the toner accuracy analysis of FIG. 4. The colorant selection module S122 selects a colorant combination that most accurately represents the desired color for rendering the print job. In other words, the module 122 can determine the colorant combination with the lowest number of pixels lying outside the boundaries of the desired color gamut as being the most accurate combination. The method starts at S602. For each candidate colorant combination, the module 122 determines how accurate the candidate colorant combination is at representing a desired color at S604. The accuracy information was computed at S416 and can be transmitted from the accuracy determination module 120 to the colorant selection module 122. Each candidate colorant combination is ranked based on the most accurate to the least accurate, i.e., from lowest number of pixels lying outside the desired color gamut to highest number of pixels lying outside the desired color gamut, at S606. The module 122 determines whether the highest ranking candidate colorant combination more accurately represents the desired color over the original CMYK colorant combination at S608. In contemplated embodiments, the accuracy determination module 120 determines an accuracy of the original CMYK colorant combination in a same operation performed for each candidate colorant combination at S416. In response to the highest ranking candidate colorant combination being less accurate than the original CMYK colorant combination (NO at S608), the original CMYK colorant combination is selected as the colorant combination for associating with the object in the rendering process at S610. In response to the highest ranking candidate colorant combination being more accurate than the original CMYK colorant combination (YES at S608), the candidate colorant combination having the highest rank (i.e., the lowest number of pixels outside the boundary) is selected as the ideal colorant combination for associating with the object in the rendering process at S612. The selected one of the ideal or original colorant combination can be saved in the memory and applied to the corresponding object at the time of RIPping and/or printing at S614. The method ends at S616.

In another embodiment, the colorant selection module S122 can select the ideal colorant combination based on the lowest toner cost. For example, instances are contemplated where the cost of a particular fifth colorant is relatively expensive, even where little colorant is needed. Accordingly, the module 122 can determine whether the user will incur a savings using a candidate colorant combination including a fifth colorant. FIG. 6 is a flowchart showing a process 600 for selecting the ideal colorant combination based on the lowest toner cost. The method starts at S702. The module 122 determines the toner cost for rendering the output using the fifth colorant in each candidate combination at S704. This cost can be computed, for example, by calculating the number of pixels needed to render the job using the fifth colorant by a corresponding cost per pixel. In contemplated embodiments, a toner cost module (not shown) can determine the toner cost. Alternatively, the toner usage module 118 can determine the cost after determining the toner usage information. Similarly, the module can determine the toner cost for using the original CMYK colorant combination. Each candidate colorant combination is ranked based on the lowest toner cost to highest toner cost at S706. The module 122 determines whether the highest ranking (i.e., lowest costing), candidate colorant combination reduces the toner cost over the original CMYK colorant combination at S708. In response to the highest ranking candidate colorant combination not reducing the toner cost over the original CMYK colorant combination (NO at S708), the original CMYK colorant combination is selected as the colorant combination for associating with the object in the rendering process at S710. In response to the highest ranking candidate colorant combination reducing the toner cost over the original CMYK colorant combination (YES at S708), the candidate colorant combination having the highest rank is selected as the ideal colorant combination for associating with the object in the rendering process at S712. The ideal and/or original colorant combination can be saved in the memory and applied to the corresponding object at the time of RIPping and/or printing at S704. The method ends at S716.

Figure 8:
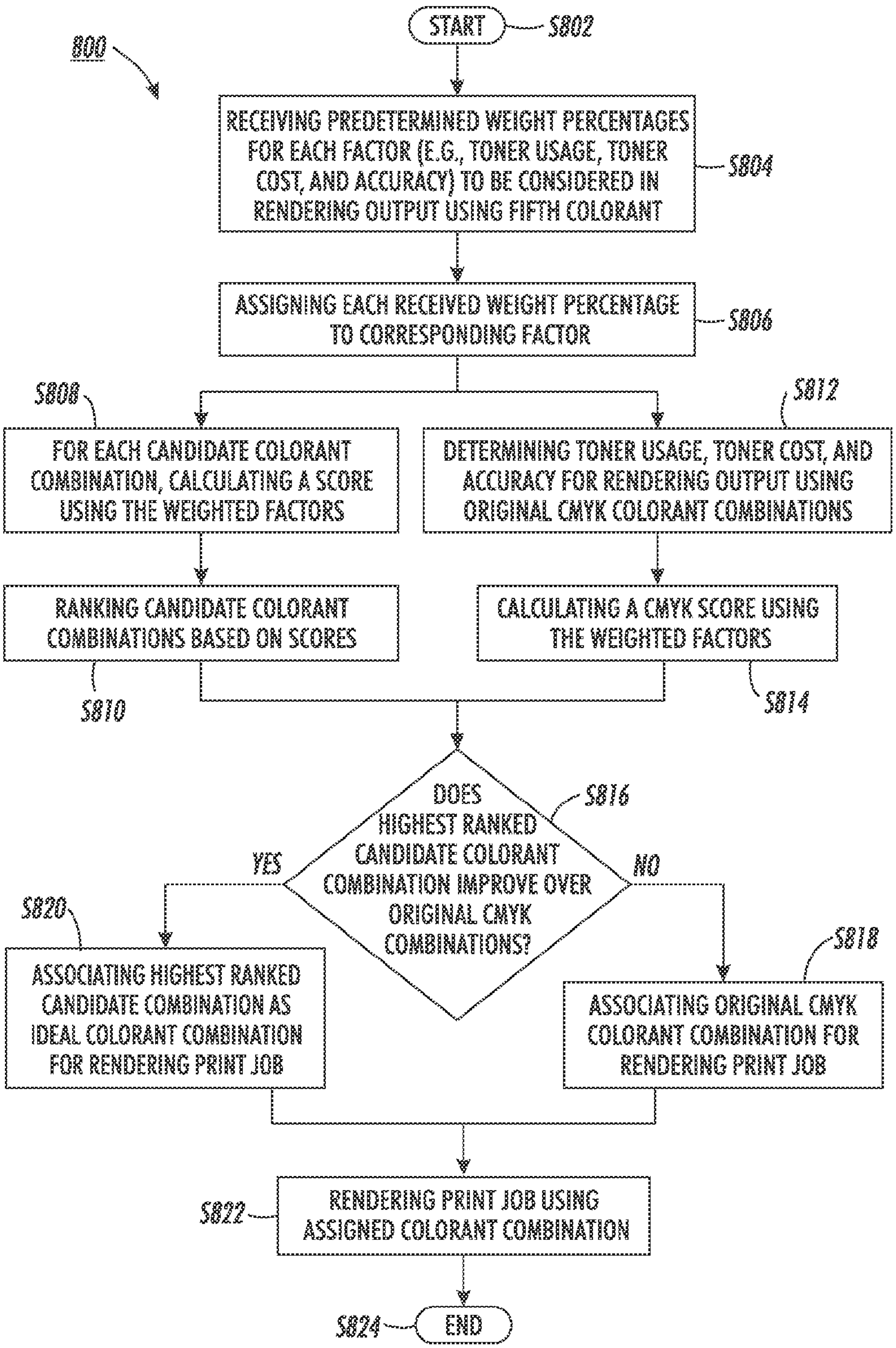
FIG. 8 is a flow chart illustrating a process for selecting a colorant combination based weighting percentages used in a multi-factor analysis.

FIG. 8 is a flow chart illustrating a process for selecting a colorant combination based weighting percentages used in a multi-factor analysis. The method starts at S802. The colorant selection module 122 receives predetermined weight percentages for each factor (e.g., toner usage, toner cost, and accuracy) to be considered in rendering output using the fifth colorant at S804. These weight percentages can be received as user-input, or they can be pre-designated. These weight percentages are based on the importance each factor is given in the final selection of a colorant combination. For example, for a particular print job, the desired color accuracy may be more important to the user than the toner usage, and therefore the former is given greater consideration when compared to the latter. In different type print jobs, in another example, minimizing the costs may be of highest importance and the accuracy is less important.

The module 122 assigns each received weight percentage to a corresponding factor at S806. For each candidate colorant combination, a score is calculated using the weighted factors at S808. The candidate colorant combinations are ranked based on respective scores at S810.

Continuing with FIG. 8, for the selected factors, the toner usage, toner cost, and accuracy information is determined for rendering the object using the original CMYK colorant combination at S812. A CMYK score is calculated by applying the weighting percentages to the CMYK factors at S814. The module 122 determines whether the highest ranking candidate colorant combination score is better than the CMYK score of the original CMYK colorant combination at S816. In response to the score of the highest ranking candidate colorant combination not being better than the score of the original CMYK colorant combination (NO at S816), the original CMYK colorant combination is selected as the colorant combination for associating with the object in the rendering process at S818. In response to the score of the highest ranking candidate colorant combination being better than the score of the original CMYK colorant combination (YES at S816), the candidate colorant combination having the highest rank is selected as the ideal colorant combination for associating with the object in the rendering process at S820. The selected ideal or original colorant combination can be saved in the memory and applied to the corresponding object at the time of RIPping and/or printing at S822. The method ends at S824.

In one contemplated embodiment, the process described in FIGS. 3-8 can be performed (i.e., repeated) for each additional colorant housing greater than CMYK located, or adapted to be loaded, in the printer device. The system can be adapted to select the ideal fifth colorant to use when multiple separations are within a job. The selection can be based on frequency, cost of colorants, toner consumption and/or savings between colorants, and a combination of the above.

One aspect of the present disclosure is the lowering of print costs. By determining the ideal colorant combination using and/or considering a loaded fifth colorant, the amount of toner consumed in rendering the print can be minimized, and thus translated into lowered print costs.

Another aspect of the present disclosure is the determination of the ideal colorant combination on a desired object basis, thus further lowering toner consumption and overall printing costs.

Although the method 100 and 300-600 was illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for optimizing toner usage on an output device capable of rendering in five or more colorants, the method comprising:

receiving a print job for rendering a print job;

generating at least one candidate colorant combination using multiple colorants;

determining an accuracy of the at least one candidate colorant combination for rendering a select object of the print job, including:

determining a color gamut for a desired color;

determining where the at least one candidate colorant combination falls in the color gamut; and, selecting an ideal candidate colorant combination based on a comparison of at least one factor with one of a second candidate colorant combination and an original CMYK colorant combination.

2. The method of claim 1, wherein the generating at least one candidate colorant combination includes:

determining a color gamut for each possible colorant combination;

determining if the color gamut can achieve the desired color; and, in response to the color gamut being able to achieve the desired color, associating the possible colorant combination as one of the at least one candidate colorant combination.

3. The method of claim 2, wherein the determining if the color gamut can achieve the desired color includes:

for each color gamut, representing the desired color gamut and the desired color in a device independent color space.

4. The method of claim 1, wherein the method is performed for a group consisting of: each object within a page; each image within a page; each page within a sheet; and each sheet within the print job.

5. The method of claim 1, wherein the determining where the at least one candidate colorant combination falls in the color gamut includes:

mapping pixels of the print job to the desired color gamut for each candidate colorant combination.

6. The method of claim 1, wherein the determining the accuracy further includes:

for the each candidate combination, determining a number of pixels lying outside a boundary of the desired color gamut.

7. The method of claim 1, wherein the selecting includes:

determining at least one of toner usage and) a toner cost;

assigning weight percentages to at least two of the toner usage, toner cost and the accuracy based on a predetermined threshold;

calculating a score using weighted factors for each candidate colorant combination; and, ranking the candidate colorant combinations based on the scores; and, selecting a highest ranked candidate colorant combination as the ideal candidate colorant combination.

8. The method of claim 7, further comprising:

comparing the score of the highest ranked candidate colorant combination with a score of an original CMYK colorant combination; and, assigning one of the highest ranked candidate colorant combination and the original CMYK combination having a better score to the print job.

9. The method of claim 1, further comprising:

designating a select additional color channel based on one of a predetermined selection and user-input.

10. A system for optimizing toner usage on an output device capable of rendering in five or more colorants, the system comprising:

a colorant determination device including:

a colorant combination generation module configured to generate at least one candidate colorant combination in response to receiving a print job instruction for rendering a print job;

a toner usage determination module configured to determine an amount of toner needed for the at least one colorant combination to render an object of the print job, an accuracy determination module configured to determine an accuracy of the at least one candidate colorant combination at representing a desired color, the accuracy determination module being configured to:

determine a color gamut for the desired color, and determine where the at least one candidate colorant combination falls in the color gamut;

a selection module configured to select an ideal colorant combination based on at least one factor including the toner usage, a toner cost, and the accuracy, the selection module operative to compare the at least one factor of the at least one candidate colorant combination with at least a similarly computed factor of a second candidate colorant combination; and a memory which stores the modules and a hardware processor in communication with the memory configured to execute the modules.

11. The system of claim 10, wherein the colorant combination generation module is further configured to:

determine a color gamut for each possible colorant combination;

determine if the color gamut can achieve the desired color; and, in response to the color gamut being able to achieve the desired color, associate the possible colorant combination as one of the at least one candidate colorant combination.

12. The system of claim 11, wherein the colorant combination generation module is further configured to:

for each color gamut, represent the desired color gamut and the desired color in a device independent color space.

13. The system of claim 10, wherein the colorant determination device determines the colorant combination for a group consisting of: each object within a page; each image within a page; each page within a sheet; and each sheet within the print job.

14. The system of claim 10, wherein the accuracy determination module is further configured to:

map pixels of the print job to the color gamut for each candidate colorant combination.

15. The system of claim 10, wherein the accuracy determination module is configured to:

for the each candidate combination, determine a number of pixels of the print job that are outside boundaries of the color gamut and associate the number of pixels with accuracy.

16. The system of claim 10, wherein the selection module is configured to:

assign weight percentages to factors including the toner usage, toner cost and the accuracy based on a predetermined threshold;

calculate a score using the weighted factors for each candidate colorant combination; and, rank the candidate colorant combinations based on the scores; and, select a highest ranked candidate colorant combination as the ideal candidate colorant combination.

17. The system of claim 16, wherein the selection module is configured to:

compare the score of the highest ranked candidate colorant combination with a score of an original CMYK colorant combination; and, assign one of the highest ranked candidate colorant combination and the original CMYK combination having a better score to the print job.

18. The system of claim 16, wherein the selection module is configured to:

using the amount of toner needed for the at least one colorant combination, rank the at least one candidate colorant combination based on toner cost; and, associate the candidate colorant combination having the lowest toner cost as the select colorant combination.

19. The system of claim 10, wherein the colorant determination device is configured to:

designate a select additional color channel based on one of a predetermined selection and user-input.

* * * * *